United States Patent Office 3,536,335
Patented Oct. 27, 1970

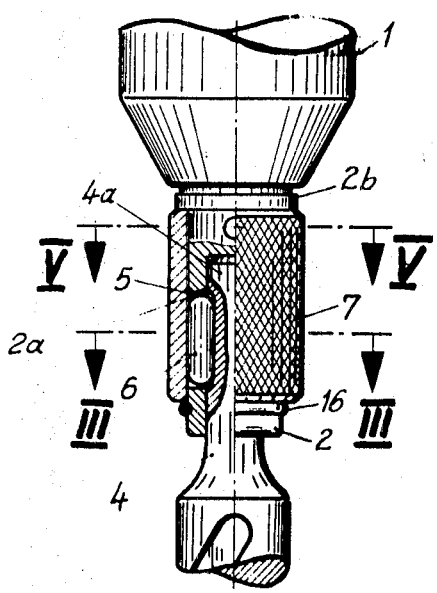
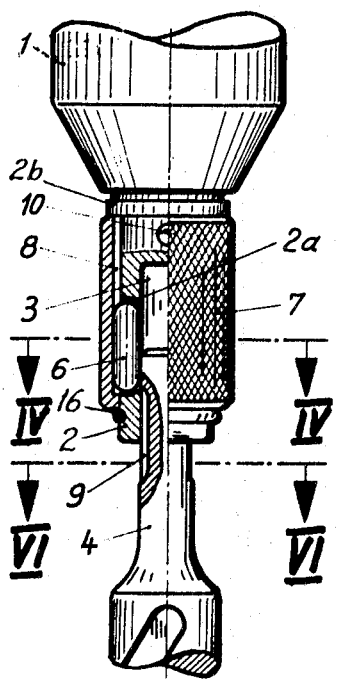
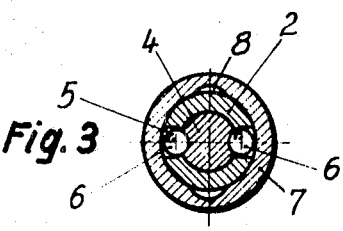
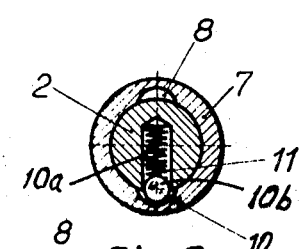
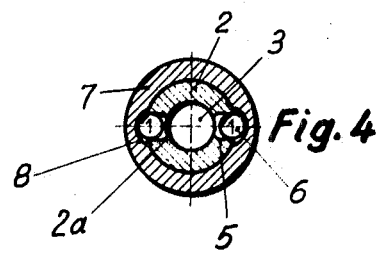
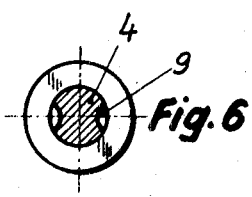
INVENTOR
PETER SCHMUCK

3,536,335
TOOL HOLDER DEVICE
Peter Schmuck, Mauren, Liechtenstein, assignor to Hilti Aktiengesellschaft, Schaan, Liechtenstein
Filed July 10, 1968, Ser. No. 743,789
Claims priority, application Germany, July 24, 1967,
H 59,673
Int. Cl. B23b *31/10*
U.S. Cl. 279—81          11 Claims

ABSTRACT OF THE DISCLOSURE

A tool holder has a centrally arranged bore and axially extending slots containing cylindrically shaped locking members in the wall of the bore. The locking elements are movable in the radial direction relative to the axis of the bore. A ring member is movably positionable about the tool holder for urging the locking elements inwardly for engagement with grooves in the shank of the tool. By moving the ring member to a selected position, the locking elements can be displaced ouwardly from the grooves in the tool to permit its removal from the hammer drill.

SUMMARY OF THE INVENTION

The invention is directed to a tool holder for a hammer drill affording a positive interconnection between the tool holder and a tool and, more particularly, it concerns the use of cylindrically shaped locking elements and means for positioning the elements in locking engagement with the tool.

Drill chucks of the type generally used in rock drill machines are not suitable for hammer drills because the tool is loosened by the vibrations developed within the drill and, further, the drill chucks are not able to withstand the great stresses developed.

Tool holders have been used in hammer and rock drills having a tool receiver section with a conical configuration arranged to receive a conically shaped tool shank and to hold it by means of friction. In such tool holders there is the disadvantage that the tool is wedged into engagement and its removal becomes difficult and can only be accomplished by heavy striking on an ejection wedge. In such tool removal operations it is quite possible that the drill will be damaged. Further, in tool holders of this type there is a power loss due to the friction developed in the conically shaped tool connection.

In another known arrangement for engaging a tool within a tool holder, balls are arranged in radially disposed bores in the tool holder and are brought into engagement in recesses on the tool shank by selectively positioning an operating ring about the tool holder. When balls are used as the locking elements there is the disadvantage that relatively small bearing surfaces are afforded due to the spherical form of the locking elements and as a result high surface pressures are developed. In such locking arrangements the surfaces of the tool shank contacting the ball shaped locking elements are prematurely worn out and deformed to the point that they can no longer be used.

Therefore, the primary object of the present invention is to provide a locking arrangement for a tool in a tool holder which avoids the various disadvantages of the prior art and affords a positive connection against displacement due to the various forces acting on the tool within the tool holder.

Another object of the invention is to provide locking elements which afford ease in the insertion and removal of the tool from the holder and which provide sufficient connecting surface to avoid the development of unduly large pressures between the locking elements and the engagement surfaces on the tool.

Still another object of the invention is to provide locking elements of the proper shape and dimension so that they are not damaged or distorted due to the movement imparted from the tool holder to the tool.

Yet another object of the invention is to provide a lock for positively fastening in position the means which urge the locking elements into engagement with the tool.

Moreover, another object of the invention is to provide a locking arrangement for a tool holder in a drill which is simple in design, easy to operate and does not expose its various components to damage or distortion during the operation of the drill.

Accordingly, in the invention cylindrically shaped locking elements are housed within slots in a tool holder and an operating ring is provided for urging the locking elements into holding engagement with grooves or recesses in the periphery of the shank of a tool. Due to their elongated cylindrical shape the locking elements afford a large bearing surface with the tool as distinguish from the previously known devices in which balls have been used. With larger bearing surfaces provided, a lower surface pressure is developed which affords a longer life for the tool.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:
FIG. 1 is a longitudinal view partly in section illustrating a portion of a hammer drill embodying the locking arrangement of the present invention with a tool disposed in locked engagement within a tool holder;

FIG. 2 is a view similar to FIG. 1, however the tool is in a disengaged position and is partly removed from the tool holder;

FIG. 3 is a transverse section taken along line III—III in FIG. 1;

FIG. 4 is a transverse sectional view taken along line IV—IV in FIG. 2;

FIG. 5 is transverse sectional view taken along line V—V in FIG. 1; and

FIG. 6 is a transverse sectional view taken along line VI—VI in FIG. 2.

DETAILED DESCRIPTION OF THE PREFERRED EMBODIMENT

In FIGS. 1 and 2 the forward end of a hammer drill housing 1 is shown with a tool holder 2 extending axially outwardly from the housing. The tool holder 2 is adapted to be driven by means, not shown, disposed within the housing 1. The tool holder 2 is cylindrical in shape and has a centrally arranged blind bore 3 extending inwardly from its forward end. As shown in FIG. 1, a tool 4 having a cylindrically shaped shank fits within the bore 3 of the tool holder and is seated at its end against the bottom of the bore. As shown in FIGS. 3 and 4, a pair of diametrically opposed slots 6, oblong in shape, are formed in the tool holder and open along the radially inner side thereof to the bore and along the radially outer side to the outer surface of the tool holder 2. Each of the slots 5 contains a cylindrically shaped locking element 6 which is movable through the slot in the radial direction. To prevent the locking element 6 from being displaced from the slots when there is no tool in the bore of the holder, a nosing 2a is provided on the radially inner edges of the slots to prevent the element from entering fully into the bore. It will be noted, however, that the nosings 2a are arranged to permit at least a portion of the locking elements to enter into the bore 3.

Closely fitted about the exterior of the tool holder is an operating ring 7 which is arranged to be rotated about the longitudinal axis of the tool holder and is fixed against movement in the axial direction by a collar 2b on the tool holder and by a snap ring 16 located around the forward edge of the operating ring and fitted onto the tool holder. As displayed in FIGS. 1 and 2, the exterior surface of the operating ring is knurled to provide an adequate gripping surface. In its radially inner periphery, the operating ring 7 has a pair of diametrically opposed axially extending oblong recesses 8 which extend from the collar 2b on the tool holder forwardly to a point closely spaced from the snap ring 16. As can be seen in FIGS. 2 and 4, the recesses 8, when aligned with the slots 5 in the tool holder, permit the locking elements to be displaced outwardly entering into the grooves 8 so that the tool holder device is in its unlocked position. As the operating ring 7 is rotated from the unlocked position, the locking elements are urged inwardly by the inner peripheral surface of the operating ring.

To facilitate the displacement of the locking elements in the radial direction during insertion and removal of tools, their longitudinal ends are formed with an outwardly curved domed surface or with an outwardly inclined rectilinear surface to prevent binding and assure ease in the movement of the locking element.

The shank 4 of the tool is provided with recesses or grooves 9 extending in parallel relationship with the axis of the bore 3 and arranged to receive the radially inner periphery of the locking elements 6.

In FIG. 1 the tool shank 4 of the tool is shown in locked engagement within the tool holder 2, the locking elements 6 are displaced radially inwardly by the inner peripheral surface of the operating ring 7 and fit within the longitudinally extending grooves 9 in the shank. When the tool is to be removed, the operating ring is rotated about the axis of the bore sliding on the radially outer surface of the tool holder until the grooves 8 in its inner surface are in alignment with the locking elements 6 within the slots 5. In this position by movement of the tool the locking elements are displaced radially outwardly into the grooves and the tool can be removed from the bore. After a tool is inserted into the bore and the operating ring is rotated from the unlocked position, the obliquely terminating sides of the recesses 8 urge the locking elements 6 radially inwardly into engagement within the grooves 9 in the shank 4 of the tool. Accordingly, with the locking element held in the radially inward position by the inner surface of the operating ring, see FIG. 3, a positive connection is provided between the tool holder and the tool shank 4 by means of the locking elements 6.

The longitudinal extent of the grooves 9 in the tool shank 4 is somewhat greater than the length of the locking elements 6 so that the striking power of the hammer drill transmitted through the tool holder to the tool is not exerted against the locking elements 6. This feature of the grooves 9 prevents damage to the locking elements during the use of the hammer drill. The component of force acting in the radial direction due to the transmission of the moment of rotation to the locking elements 6 is absorbed in the locked position by the operating ring 7, see FIGS. 1 and 3.

To prevent an accidental opening of the locking engagement between the tool and tool holder due to the vibratory action which is transmitted to the operating ring, a catch 10, see FIGS. 1, 2 and 5, is provided which holds the operating ring in locked position. As shown in FIG. 5, the catch 10 is located in the end of the tool holder adjacent the housing 1 and is formed of a blind bore 10a disposed perpendicularly to the axis of the bore 3. A spring 11 is positioned within the bore 10a. A ball 10b is fitted within the radially outer end of the bore 10a and when the ring 7 is rotated fully into the locked position, that is, with the grooves 8 spaced angularly 90° from the slots 5, the ball 10a fits within the groove 8 to provide the desired locking engagement with the operating ring to prevent any accidental opening of the locking engagement between the tool holder and the tool. It will be appreciated that other types of locking means can be provided for the operating ring and, in addition, special means can be employed to hold the operating ring in place when the locking elements are disposed in the unlocked position.

As mentioned previously, the forward ends of the grooves 8 are closed by the front edge of the operating ring adjacent the snap ring 16 to prevent the penetration of drillings into the grooves.

What is claimed is:

1. A device for securing tools in a drill comprising a tool holder member, said tool holder member comprising an annular shaped wall forming a bore extending inwardly from one end of said tool holder member and adapted to receive a tool therein, said wall having at least one longitudinally extending slot formed therein and extending in the axial direction of said bore, said slot being open along the radially inward side of said wall to said bore and along the radially outward side of said wall which forms the outer surface of said tool holder member laterally adjacent said bore, a longitudinally extending cylindrically shaped locking element fitted within said slot and having its longitudinal axis extending in the direction of the axis of said bore and arranged for radial movement therethrough in the direction substantially normal to the axis of said bore, said locking element adapted to be urged inwardly into said bore presenting an arcuate shaped surface extending in the longitudinal direction of said locking element for locking a tool in place therein and to be urged outwardly for releasing the tool from said bore, and means disposed about and movable relative to said tool holder member so that by disposing said means in one position said locking element is urged inwardly through said slot and held in an inward locked position within said bore and in another position said locking element is allowed to more radially outwardly to said slot and is displaced outwardly from said bore into a released position.

2. A device as set forth in claim 1, wherein an inwardly projecting nosing is provided on the inner surface of said wall along the edges of said slot for preventing said locking element from being dislodged from said slot inwardly into said bore while allowing a portion of said cylindrically shaped locking element to extend into said bore.

3. A device as set forth in claim 1, wherein said tool holder member is cylindrical in shape, and said bore therein is disposed along the axis of its cylindrical section, and a pair of slots are disposed in said tool holder member arranged in parallel relationship with the axis of the cylindrical section thereof and being disposed on opposite sides of said bore.

4. A device as set forth in claim 2, wherein the end surfaces of said locking elements have an outwardly rounded dome-like configuration.

5. A device as set forth in claim 2, wherein said locking elements have rectilinear sloping end surfaces projecting from the cylindrically shaped wall surfaces thereof and directed toward the axis of said locking elements.

6. A device as set forth in claim 1, wherein said means disposed about said tool holder comprises a ring member in closely fitting sliding engagement with the exterior surface of said tool holder member and arranged to be rotated about said tool holder for displacing said locking elements between the locked and released positions.

7. A device as set forth in claim 6, wherein said ring member has a longitudinally extending groove formed in its inner surface extending in parallel relationship with said slot in said tool holder member, said groove arranged to be aligned with said slot by rotating said ring member whereby said locking element can be displaced outwardly into said groove when said groove and slot are in alignment.

8. A device as set forth in claim 7, wherein said groove in said ring member is closed at the end of said ring member adjacent the opening into said bore and extends toward the opposite end of said ring member.

9. A device as set forth in claim 8, wherein locking means are disposed within said tool holder member for locking said ring member in position when said locking elements are urged inwardly into said bore by the inner surface of said ring member.

10. A device as set forth in claim 9, wherein said locking means comprises a second bore formed in said tool holder member with the axis thereof disposed transversely to the axis of said bore adapated to contain a tool, a spring positioned within said second bore, a ball member located within said second bore and arranged to be urged outwardly by said spring for engagement in the groove in said ring member for locking said ring member in position.

11. A device as set forth in claim 1, wherein a tool having a longitudinally extending shank end is arranged to have the shank end thereof fitted within the bore in said tool holder, said shank end of said tool having a groove formed therein arranged to align with said slot in said tool holder member for receiving said locking element therein in locking engagement, and said groove having a length greater than that of said locking element to prevent damage to the locking element resulting from the striking power of said tool holder member on said tool.

References Cited

UNITED STATES PATENTS

| | | | |
|---|---|---|---|
| 548,037 | 10/1895 | Cox | 279—81 |
| 704,081 | 7/1902 | McHale | 279—87 |
| 1,433.527 | 10/1922 | Browand | 279—81 |
| 2,869,600 | 1/1959 | Dreier | 279—79 |

ROBERT C. RIORDON, Primary Examiner

D. D. EVENSON, Assistant Examiner

U.S. Cl. X.R.

279—87